2,311,730

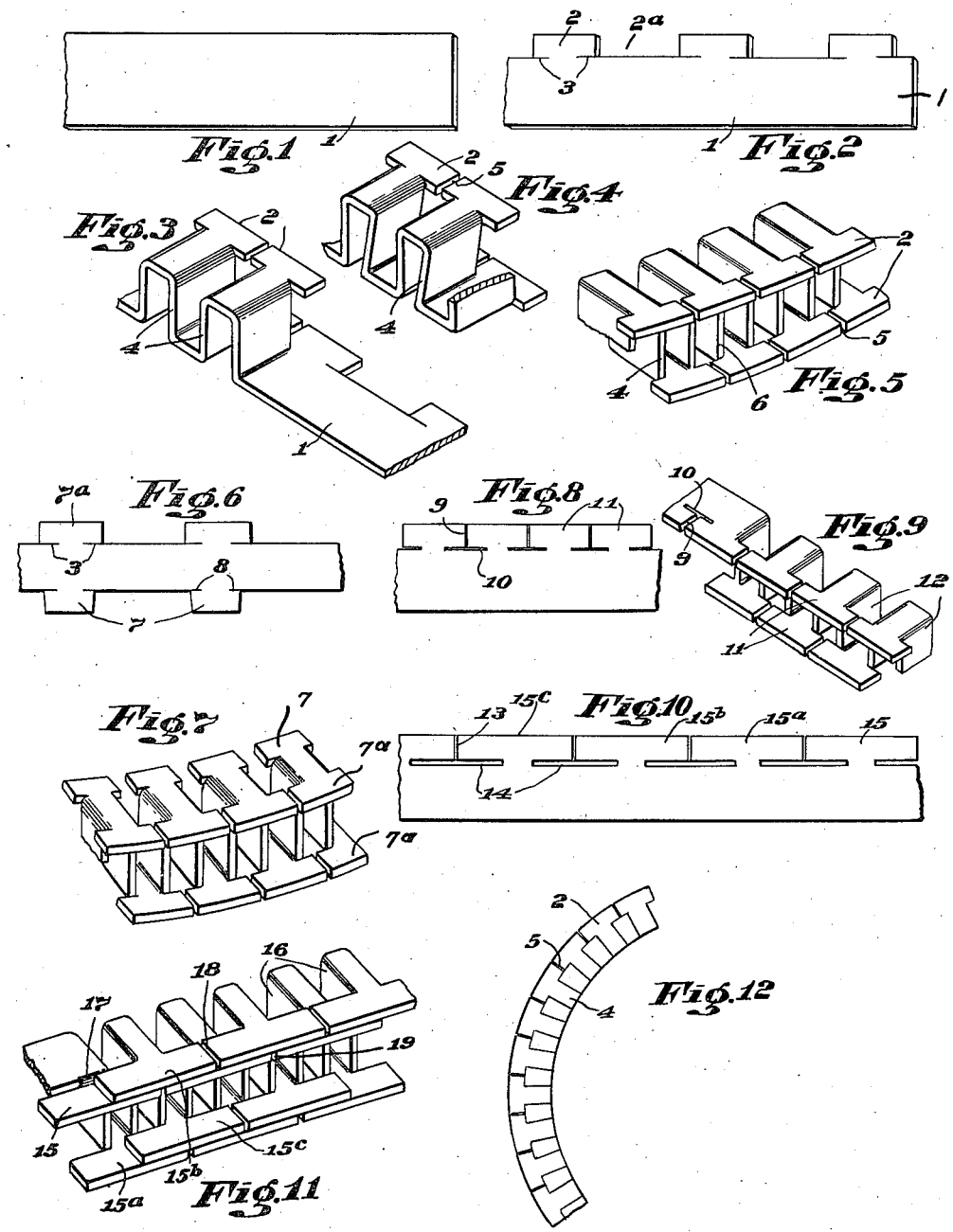
Feb. 23, 1943. T. A. BOWERS 2,311,730
METHOD OF MAKING REVERSELY FOLDED PISTON RINGS
Filed March 28, 1940  2 Sheets-Sheet 1
INVENTOR
Thomas A. Bowers
BY
ATTORNEY Feb. 23, 1943. T. A. BOWERS 2,311,730
METHOD OF MAKING REVERSELY FOLDED PISTON RINGS
Filed March 28, 1940 2 Sheets-Sheet 2
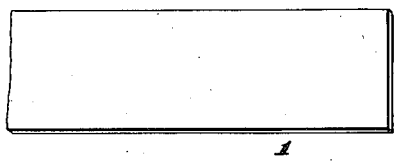
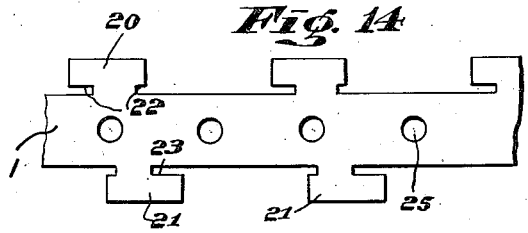
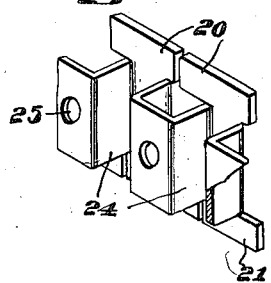
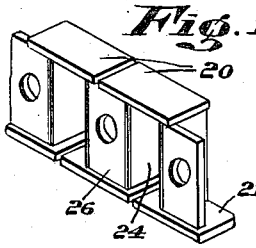
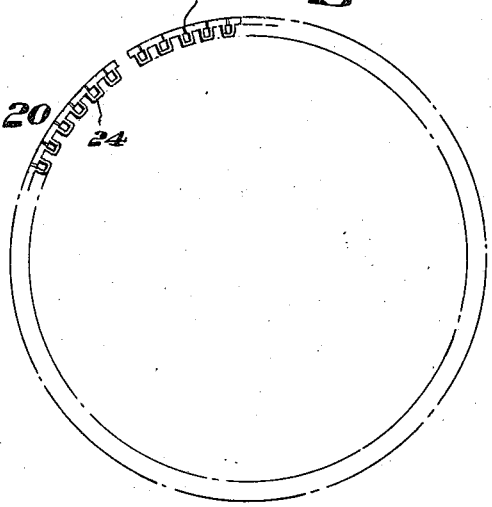
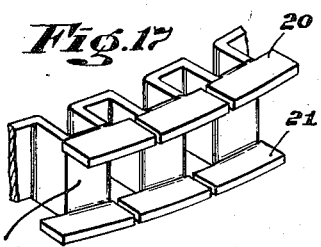
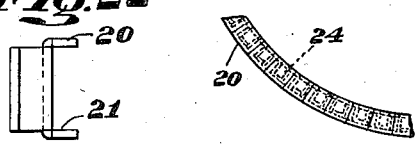
INVENTOR
Thomas A. Bowers
BY
Munros N. Hamilton
ATTORNEY Patented Feb. 23, 1943

UNITED STATES PATENT OFFICE 2,311,730

METHOD OF MAKING REVERSELY FOLDED PISTON RINGS

Thomas A. Bowers, Boston, Mass., assignor to Power Research Corporation, Boston, Mass., a corporation of Massachusetts Application March 28, 1940, Serial No. 326,342

2 Claims. (Cl. 29—156.6)

This invention relates to methods of making piston rings from sheet materials and is a continuation in part of my co-pending applications, Ser. No. 268,721, filed April 19, 1939; Ser. No. 276,503, filed May 31, 1939; and an improvement on my earlier Patents Nos. 1,796,882 dated March 17, 1931, 1,796,883 dated March 17, 1931, 2,076,554, dated April 13, 1937, and 2,076,539 dated April 13, 1937.

In the manufacture of piston rings of the oil control type, it is customary to provide, among other features, extending circumferential edges for more efficiently scraping oil from the wall of a cylinder. Such edges are attained by various methods, as by relieving the periphery of solid rings, or by utilizing a plurality of thin steel rings supported on a spacing ring, or in other ways. The solid rings fall when their recessed or relieved portions become filled up and clogged with carbon. The steel ring assembly referred to is subject to formation of carbon to a lesser extent and further objectionable in that the assembly necessarily includes a steel expander which greatly raises the cost of the ring assembly, develops excess wear on a cylinder wall, and is hard to assemble about a piston.

It is a principal object of the invention to improve methods of manufacturing piston rings and to devise procedures for modifying the manufacture of flexible piston rings of the reversely folded strip type with a view to incorporating novel ring portions in such structures whereby they may be rendered particularly adapted for use as oil control piston rings and be an improvement on the structures above referred to. The invention also aims to present methods of making piston rings from sheet materials which are cheap, fast, and adapted to be carried out with tool machinery.

Attainment of these and other objects of the invention will appear in the following description of the drawings and the discussion relating thereto.

In the accompanying drawings:

Fig 1 is a fragmentary perspective view illustrating sheet material which may be employed in methods of forming piston rings of the invention.

Fig. 2 is a perspective view illustrating a step in the treatment of sheet metal to form a piston ring.

Fig. 3 is a fragmentary perspective view illustrating another step in the method referred to.

Fig. 4 is a perspective view illustrating another step.

Fig. 5 is a perspective view illustrating still another step resulting in a finished ring.

Figs. 6 and 7 illustrate a modified method of making a piston ring.

Figs. 8 and 9 illustrate another modified method.

Figs 10 and 11 illustrate still another modification in the methods referred to.

Fig. 12 is a fragmentary plan view of a finished ring as effected by the method disclosed in Figs. 1-5 inclusive.

Figs. 13-17, 20 and 22 illustrate another general type of method of making piston rings from sheet metal; and Figs 18, 19, and 21 illustrate a modification of the method indicated in Figs. 13-17 inclusive.

Referring in detail to the drawings, Figs. 1-5 and Fig. 12 illustrate one general type of method for making piston rings; Figs. 6-11 inclusive relate to modifications thereof; and Figs. 13-22 inclusive indicate another general type of method for making piston rings of the reversely folded strip form.

Having reference to the construction included in Figs. 1-5 inclusive and Fig. 12, numeral 1 indicates a length of sheet material employed in making the rings of the invention. The sheet is of a resilient character and may be spring steel, alloy, or other metal material. A development in piston ring construction is to reversely fold resilient sheet material, of the character noted, into ring bodies in some suitable manner as has, for example, been described in the above referred to patents and applications. These reversely folded rings are characterized by great flexibility and extensibility constituting a definite advance in the art.

According to the present invention, a strip or sheet of the resilient material is formed in some suitable manner to provide a ring of the reversely-folded character described in which are incorporated, as an integral part thereof, extending portions designed to function as oil scraping edges. As illustrated in Fig. 2, the strip 1 is punched along one edge thereof to form segments 2 and spaces 2a occurring therebetween. Cutting is also carried out to effect slits 3 which extend inwardly of the segments to partly sever these segments. The formed strip is folded reversely of itself along lines of bending, the positions of which are in general determined by the slits 3, whereby the folds are bent away from the segments 2 as illustrated in Fig. 3. The folded material is arranged in some suitable position such as that illustrated in Figs. 4 and 5 and a length of the formed material of a size suitable for comprising a desired piston ring diameter is formed into an annular body and treated with various finishing operations such as grinding, hardening and the like, to present a completed ring as illustrated in Fig. 12.

The operations described in connection with forming the sheet may be effected by apparatus commonly referred to as "tool machinery." For example, the punching of openings 2a may be readily effected with conventional punch press mechanism. Similarly, the cutting of slits 3 can be effected by cutting or shearing dies, and folding of the material is achieved with forming dies or press mechanism. Forming a straight length of folded material into a circular body can be effected in several ways, one example of which is to force a length of the material through an annular rack or die.

In the ring construction shown there is provided an annular supporting structure made up of the folds or web portions 4 extending between top and bottom sides, or "land surfaces," of the ring, which in turn are comprised by the crowns or segments 2 arranged in contiguous relation to one another. The disposition of the webs 4 relative to the said sides may vary. In the preferred form shown in Fig. 3, the webs occur substantially at right angles to the land surfaces or sides. In the form shown in Fig. 4, the webs are angularly disposed between the sides. As customary with reversely folded rings, the annular supporting structure is characterized by an extensible and compressible character obtained from arranging resilient folds of metal in spaced relation whereby the folds may be compressed upon one another and thereafter tend to revert to their original open position.

A feature of the invention consists in the arrangement of the segments 2 in adjacent relation to one another to constitute a substantially continuous circumferential edge. It has been found that such an edge for oil scraping purposes is the equivalent of, and an improvement upon, a fully continuous edge as comprised by a solid ring. By the disposition of the segments or crowns 2 on the supporting structure as shown, there are further provided spaced-apart upper and lower circumferential edges which are embodied in the supporting structure and integral therewith and yet extend beyond it so that the outer edges 6 of the webs 4 are maintained from contact with the walls of a cylinder. In each of the circumferential edges thus formed, there occur interstices 5, with the interstices of one edge occurring in staggered relation with respect to the interstices of the other edge, and the interstices in both edges cooperating to maintain the compressibility of the ring. Either one as well as both of the edges may be utilized for oil scraping if desired.

Another feature of the method consists in forming novel "land surfaces" or "sealing surfaces" which provide for satisfactory seating or sealing of the ring in its groove. This is effected by forming the segments of a size such that when they are arranged adjacent one another, they may comprise a surface large enough for sealing purposes. The segments are also so formed and arranged by the method that they may constitute only a part of the radial width of the ring and may occur at one side of the ring. This makes possible the construction of a light, efficient ring, having a supporting structure made up of web portions of highly open character well suited to passage of oil radially or vertically through the ring.

In operation the ring functions as a gapless ring with its ends adapted to abut one another. By its circumferential compressibility and extensibility, the ring completely engages the wall of a cylinder, conforming to any non-uniformity or worn areas in the cylinder and exerting a substantially uniform pressure at all points therealong. It should be noted that the ring attains its extensible character without the use of any expanding means disposed between the back of the ring and its ring groove. As a result, there is less transfer of piston slap and reduction of wear ordinarily developing therefrom.

As above described, the interstices 5 of one circumferential edge are disposed in staggered relation with the interstices of the other circumferential edge so that there is a continual wiping of oil on a cylinder wall at all points therealong during reciprocation of the ring. Also, since the edges 6 of the webs 4 are disposed in a recessed position with respect to the circumferential edges of the ring formed by the segments 2, they do not contact the cylinder wall and pick up carbon particles, which reduces carbon formation at these points. At the same time, the extending portions of the segments 2 relative to the webs provide for greater efficiency in the wall pressure exerted by the ring on a cylinder wall since for any given pressure available from the reversely folded structure described, more efficient application of it is achieved through reduced contact areas comprised by the extending circumferential edges described.

The segments formed as described effect novel functioning of the ring at the time when it slaps in its groove with change of the piston stroke. In oil rings, it is customary to provide relatively large surfaces at the top and bottom sides of the ring to effect sealing with the piston groove as described above. This has objections due to the fact that at the time when the ring slaps in its groove, there is collected on one of the surfaces a relatively large body of oil which is extruded in two directions, inwardly around the groove in a desired manner and outwardly on to the cylinder wall above the ring in an undesired manner.

By the method of the invention there are provided reduced sealing surfaces, which are satisfactory for sealing the ring in its groove and yet are of reduced surface area upon which oil may collect and be extruded. Attention is directed to Figs. 5 and 12 in which it may be seen that oil collected by the circumferential edges may rapidly pass thereover into the spaces between the web portions 4, whereby a large part of the oil metered by the top circumferential edge is not subject to extrusion at all.

A number of advantages are obtained from the method described. There is presented a unitary oil ring of circumferential extensibility and compressibility, having incorporated therein substantially continuous circumferential portions which are well adapted to take the place of the multi-piece rings referred to. Considering the structure in detail, it is pointed out that the circumferential edges constitute a highly satisfactory equivalent for the two steel rings heretofore used in the art. The connecting web portions perform the double function of acting as a supporting structure which is circumferentially extensible and contractible, and constituting a spacing member which maintains the circumferential edges in spaced relation one above another, thereby taking the place of both expander and spacer structures. Also it will be seen that these desirable effects are achieved with there having been provided desirable means for allowing oil collected by the ring to be passed to the back of the piston ring groove.

Another advantage of the invention is in the cheapness of the method and materials employed in forming a ring such as that shown. The forming operations described in connection with making the ring are adapted to being carried out with conventional "tool" machinery of the type described, which provide cheap and efficient production methods. The low cost of the resilient sheet metal, together with the methods described, allows the rings to be made in production at costs substantially below those of cast iron rings or steel and cast iron ring assemblies. An immediate result of providing a cheap ring of this type is the use of such structures in original installations, a procedure which is not now resorted to, owing to the relatively greater cost of steel ring assemblies compared with cast iron rings.

The forming steps illustrated in Figs. 1–5 inclusive have been shown in connection with a length or strip of material. However, it is intended that such operations may be effected upon materials occurring in varying forms as in sheet form or in a web or roll. The strip or sheet material may further be formed with a variable cross section to effect greater strength at some points in a ring as compared with others, and a plurality of strips or sheets may be desired to be formed. The cutting or forming operations may be modified to occur angularly of the material or in other ways as hereinafter described. Also, the cutting or forming operations may be desired to be effected at other stages in the method of making the ring, as for instance after a sheet or strip of material has been folded or formed into either an intermediate or finished position or at some other point. The advantages obtained by the operations described may be resorted to in different ways and for other purposes, as for instance in the manufacture of expander rings, or other types of sealing members in reciprocating bodies.

Figs. 6–11 inclusive relate to modified methods of making rings of the same general type indicated in Figs. 1–5 inclusive. With reference to the modification included by Figs. 6 and 7, it will be noted that the forming operations have been extended to both sides of the strip to form segments or crown portions 7 and 7a, relieved as before by longitudinal slits 3 and 8, as shown in Fig. 6. The formed strip is reversely folded as before to comprise an annular body having extending circumferential edges at both the inner and outer sides of the ring as has been shown in Fig. 7, in which the inner circumferential edge of the ring is comprised by the segments 7. It should be noted that with this type of structure, the segments 7 preferably are formed smaller and of tapered formation with respect to the portions or segments 7a, so that they will readily adapt themselves to constituting the relatively smaller circumference occurring at the inner periphery of a ring. The crown portions 7 may constitute an increased bearing surface for the ring and maintain the ring in a better supported horizontal position.

A further modified method of making rings has been illustrated in Figs. 8 and 9 in which a strip of material is formed with slits or cuts 9 extending inwardly transversely of the strip and additional cuts or slits 10 extending longitudinally along the strip and intersecting the slits 9. This procedure is illustrative of a forming operation of the shearing type or slitting, in which substantially no material is removed from the strip and yet crown portions 11 are provided which may be folded into a ring body having a supporting structure made up of web portions 12, as illustrated in Fig. 9. The ring presents a relatively smaller spacing occurring between the upper and lower circumferential edges formed by the crowns 11, is characterized by the webs occurring substantially at right angles with respect to the circumferential surfaces and may be formed with some saving of material. In other respects, the ring corresponds generally to the rings already described and is possessed of substantially the same advantages with respect to sealing efficiency, circumferential compressibility and extensibility, oil handling, durability, and cheapness.

Still another modified method of making piston rings is illustrated in Figs. 10 and 11 in which a strip of material is formed with transverse slits or cuts 13, and longitudinally extending cuts 14 intersecting the slits 13, to provide extended segments 15, 15a, 15b and 15c. By forming the segments 15 of increased length, and then reversely folding the strip transversely of itself into a ring body, there is effected an overlapping relation of the segments along the circumferential edges as shown in Fig. 11. Fig. 11 discloses the arrangement of the segments 15, 15a, 15b and 15c in abutting relation to one another to provide circumferential edges of double thickness supported by an annular structure made up of webs 16, with the points of abutment in either of the edges occurring in staggered relation with respect to one another.

In addition to arranging the segments upon one another in overlapping relation, cuts 14 may be made with an increased width so that the strip material may be folded at points, as 17, to alternately position the sagment 15 in a relatively lower position with relation to an overlying segment 15b so that there result circumferential edges in each of which a series of the segments occur in contiguous relation, and in the same plane. This maintains substantially uniformly flat sealing surface throughout the top and bottom sides of the ring for seating it in a piston groove.

It should be noted that by arranging the segments 15 in overlapping relation as described, there is also effected a novel sealing effect with respect to the interstices 18 of the top row of segments, and the interstices 19 of the underlying row of segments, all of which are covered by adjacent segments. No oil can pass vertically of the ring through these interstices and with the sealing effect thus achieved, the interstices may be increased in width if desired. In addition, the wall pressure of the ring may be varied by increasing the surface area of circumferential edges of the ring which are adapted to bear on the cylinder wall, and similarly a substantially stronger edge construction is arrived at. These modifications are intended to further illustrate modification of formed sheet metal piston rings.

Figs. 13-17 inclusive relate to another general type of method in which a strip 1 is formed along one side thereof with segments 20 and along an opposite side with segments 21; also formed in the strip are slits 22 and 23. The segments 21 are further arranged to occur in staggered relation with respect to the segments 20. The formed material is then reversely folded upon itself as has been illustrated in Fig. 15, to form a ring body having webs 24 with their lines of folding extending vertically of the ring instead of radially as was the case with previously described ring forms. Thereafter the segments 20 and 21 are bent away from the supporting web structure in the manner illustrated in Fig. 16 to a position at the outside of the folded supporting structure. There is thus achieved an annular body, as indicated in Figs. 17 and 20, in which the segments 20 comprise an upper circumferential edge, and the segments 21 comprise a lower circumferential edge. At the same time a circumferentially extensible and contractible supporting structure made up of the folded webs 24 is provided for supporting the circumferential edges at the outer side thereof.

If desired, the strip may be formed with openings 25 of any suitable shape, as for instance that illustrated in Figs. 14, 15 and 16. These openings are adapted to facilitate passage of oil radially through the ring when collected by the circumferential edges described. The advantages previously noted are present with the ring in which the fold lines extend vertically, and there is a further reduction in the top and bottom surfaces of the ring against which oil may be extruded when the ring slaps in its groove.

The segments 20 and 21 may be bent from the position shown in Fig. 15 in an opposite direction, as illustrated in Fig. 18. In this modification, the segments are supported radially across the top and bottom edges of the webs 24, which imparts added stability to the structure. It should also be noted that if desired, the segments 20 and 21 may be of a size such that they do not extend beyond the outer sides 26 of the webs 24, whereby there may be formed a complete ring face without extending circumferential edges.

It will be seen that I have provided methods of forming from a reversely folded strip, a piston ring with oil scraping edges which act as novel oil metering members. The methods also have various other desirable results and characteristics and are of a character well suited to being carried out with tool machinery on a cheap and efficient basis.

While I have shown a preferred embodiment of the invention, it should be understood that various modifications and changes in the construction and materials may be resorted to, as for example other types of cutting and folding may be employed, without departing from the spirit of the invention as defined by the appended claims.

Having described my invention, I claim:

1. The method of making an oil control piston ring which comprises cutting a strip of piston ring material to form projecting spaced-apart segments which are partially separated from the remainder of the strip by cuts extending in a direction longitudinally of the strip from the ends of each segment, reversely folding the strip transversely of itself along lines of folding which, at some points, are spaced apart a distance less than the length of one of the said segments measured in a direction longitudinally of the strip to align the segments in rows and place alternate segments along the strip adjacent, said lines of folding including therebetween portions of the strip which occur between the extremities of the said cuts and which are connected to the segments, and then bending the strip to arrange the segments in annular relation and to provide a split ring body in which the segments occur at outer peripheral edges thereof.

2. In a method of making a piston ring having T-shaped crowns and connecting portions, the steps which include cutting a strip of resilient piston ring material along one edge thereof to form a plurality of projecting spaced-apart segments which are partially severed from the remainder of the strip by lines of cutting extending longitudinally of the strip from the ends of each segment a distance less than the longitudinal length of the segments, said segments adapted to constitute the heads of the said T-shaped crowns, transversely folding the strip at substantially right angles first in one direction and then in an opposite direction away from each of the segments along spaced-apart lines of folding which substantially intersect the extremities of the said longitudinal lines of cutting to provide leg portions of the said T-shaped crowns and to arrange the T-shaped crowns alternately in spaced-apart rows, and bending the folded strip into a ring body in which the heads of the T-shaped segments are aligned in circumferentially spaced-apart relation at the outer peripheral edges of the ring body and the legs of the T-shaped portions are radially disposed therein.

THOMAS A. BOWERS.